Jan. 18, 1927.  1,614,612
R. HEIN
ROLLING MILL
Filed April 13, 1923
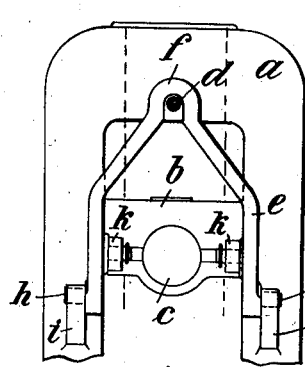
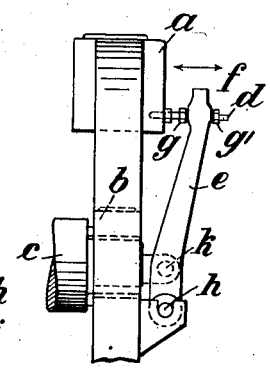
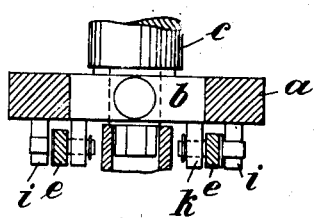
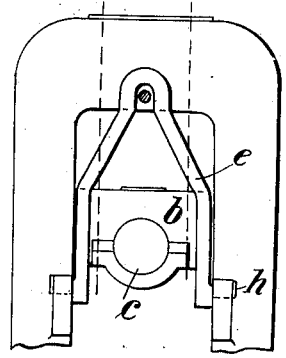
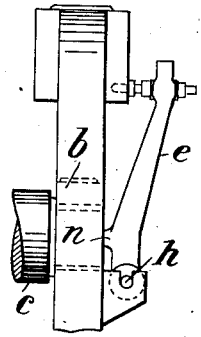
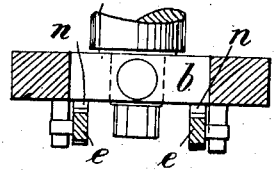

Patented Jan. 18, 1927.

1,614,612

UNITED STATES PATENT OFFICE.

RICHARD HEIN, OF WITKOWITZ, CZECHOSLOVAKIA.

ROLLING MILL.

Application filed April 13, 1923, Serial No. 631,890, and in Germany May 15, 1922.

My invention relates to rolling-mills and in particular to means for axially adjusting the housings or bearings of the rolls, which step becomes necessary for exact adjustment of the gauging sections.

The devices or arrangements hitherto employed in rolling-mills for similar purposes commonly comprise flanges connected with the bearings or housings carrying the trunnions or gudgeons of the roll, said flanges being provided with screws cooperating with the standards of the machine so that by screwing up or loosening the said screws the bearings and roll supporting members can be adjusted in axial relation as required.

It has been further suggested to employ for the purpose pressing bows or yokes cooperating with the standard and adapted to be forced into the desired position by means of screws in the sides of the standard.

In manipulating these known devices and arrangements in order to thereby axially adjust the roll, the screws controlling the relative positions of the trunnions in the two supporting standards must be loosened on both sides and displaced in the direction in which the roll is to be displaced, whereupon they are screwed up again to hold and secure the roll in the readjusted position. Now as it is practically impossible to screw up the several screws in an absolutely uniform manner or to the exactly very same degree, a great many inconveniences must necessarily arise from this mode of adjustment; in particular it frequently occurs, that the bearings and the rolls tend to come out of exactly conaxial alignment, with the result that owing to the increased friction, the trunnions are subjected to excessive wear and large amounts of energy are lost.

The object of my invention is to provide improved adjusting means with a view to remedy these defects. To this end I provide an adjusting device adapted to simultaneously act upon the bearing and supporting member on both sides or laterally of the trunnion so that at the adjusting operation both lateral portions thereof will be positively acted upon and moved at the same time. In this way the bearings and their supporting members or casings are always kept in exactly conaxial alignement with the roll and the trunnions of the latter.

In a preferred embodiment of my invention I employ for the purpose a bifurcate lever the displaceable end of which is adjustably secured to the standard of the machine by appropriate means, while the center of motion at the other end or ends thereof may be pivotally supported in suitable brackets projecting from the standard and a point intermediate between the two ends of each of the two branches or shanks of the lever is adapted to engage with the said supporting member, housing or bearing of the roll either directly or with the aid of some appropriate suplemental means, so that the said member or casing will be acted upon by the lever at two points simultaneously and laterally of the trunnions.

With the mentioned object in view my invention consists in the construction and arrangement of parts as will be hereinafter more fully described, shown in the accompanying drawings and particularly pointed out in appended claim, it being understood that changes in the form, proportion, size and minor details may be made within the scope of the claim without departing from the spirit or sacrificing any of the advantages of my invention.

I will now describe two embodiments of my invention by way of example and will then point out the essential features thereof in the claim.

In the accompanying drawings—

Figure 1 is a view showing in end elevation those parts of a rolling mill including the new device as required and sufficient for a clear understanding of the embodiment of my invention.

Figure 2 is a horizontal section and

Figure 3 a side elevation thereof.

Figures 4 to 6 are correspondingly similar views of the other embodiment of my invention.

Similar reference characters refer to similar parts in each of the several views.

In the standard $a$ of the mill the bearing and supporting member or casing $b$ is mounted in the usual manner. Near the top of the standard a threaded rod or pin $d$ is provided, said rod or pin being firmly connected with the standard, so as to project therefrom parallel to the axis of the roll $c$, and further being equipped with a pair of setting nuts $g$ and $g_1$. A yoke-shaped or bifurcate lever $e$ is configured to form a kind of an eye $f$ and is mounted on said pin $d$ with its eye $f$ intermediate between the two nuts $g$ and $g_1$, so that by displacing the nuts on the pin the lever can be set and adjusted as desired.

The two depending branches or shanks of the lever are each provided with a pivot $h$ engaging in brackets $i$ rigidly connected to or cast integrally with the standard $a$. In the embodiment shown in Figures 1 to 3 the supporting member or casing $b$ is provided on its outer face with two lugs $k$ projecting therefrom laterally of the trunnion said lugs being either rigidly, as shown, or pivotally connected with the two shanks or legs at a point intermediate between the pivot $h$ and eye $f$, so as to act upon the casing $b$ simultaneously laterally of the trunnion of the roll $e$, if the lever is turned about its fulcrum.

The adjusting operation is as follows:

When the roll requires to be shifted over together with its bearing member or housing $b$, in the one or the other direction, one of the nuts $g$, $g_1$ is unscrewed and the other one is tightened according to the direction in which the lever is to be displaced, whereby the lever is displaced on the pin $d$ and the lugs $k$ are caused to simultaneously act upon and move the casing $b$ in axial direction, thus insuring an exactly axial and even displacement of the casing and the roll.

In the modification illustrated in Figures 4 to 6 each lever shank $e'$ is provided with a simple projection in the shape of a cam $n$, the two cams being adapted to likewise engage the support or casing $b$ laterally of the trunnion and to exert simultaneously a shifting action on the casing $b$ when the lever is forced thereagainst.

The modification shown in Figures 4 to 6 is particularly intended for mills in which the two bearings of a roll must each be adjusted and maintained in the adjusted position separately or independently of the bearing at the other end of the roll as e. g. in mills with sliding bearings, where the axial pressures and stresses cause the inner flanges of the bearing to wear away, whereas the embodiment illustrated in Figures 1 to 3 is of particular advantage in connection with ball- and roller-bearings, which are not detrimentally affected by wear, so that the two bearing and supporting members of the trunnions of the roll can be displaced and adjusted simultaneously.

I have not attempted to explain all of the minute details of the construction of the pertinent parts of the machine, for it will be understood by those, to whom this specification is addressed, that the parts will necessarily be of the proper size and relationship and will be properly mounted and supported according to the tenets of machine construction. Further although I have herein shown and described only two forms of the device embodying my invention it is to be understood that various changes and modifications may be made herein without departing from the spirit of the invention and the spirit and scope of the appended claim.

What I claim is:

In a rolling mill the combination of a standard, an axially movable roller, a bearing member for the roller, mounted in the standard, also for movement axially of the roller, a bifurcated lever having its arms pivotally mounted on the standard, the axes of the said pivots of said lever being spaced from the axis of the roller, and said arms being connected to said bearing member for pivotal movement at points symmetrically arranged at opposite sides of the roller axis and in a line extending transversely of the said lever and intersecting said axis, and means connecting the free end of said bifurcated lever to said standard, said connecting means being arranged to adjust said standard to cause the latter to shift the roller and the bearing member axially and to secure said lever in adjusted position.

In testimony whereof I have signed my name to this specification this 16th day of March 1923.

RICHARD HEIN.